United States Patent
Layson, Jr. et al.

(10) Patent No.: US 10,231,006 B2
(45) Date of Patent: Mar. 12, 2019

(54) LAW ENFORCEMENT REAL TIME DIGITAL INFORMATION CHAIN OF CUSTODY ASSURANCE SYSTEM AND METHOD

(71) Applicants: Hoyt Mac Layson, Jr., Orlando, FL (US); Bradford Brian Hutson, Sr., Vero Beech, FL (US)

(72) Inventors: Hoyt Mac Layson, Jr., Orlando, FL (US); Bradford Brian Hutson, Sr., Vero Beech, FL (US)

( * ) Notice: Subject to any disclaimer, the term of this patent is extended or adjusted under 35 U.S.C. 154(b) by 0 days.

(21) Appl. No.: 14/756,835

(22) Filed: Oct. 20, 2015

(65) Prior Publication Data
US 2016/0119667 A1    Apr. 28, 2016

Related U.S. Application Data

(60) Provisional application No. 62/122,538, filed on Oct. 23, 2014.

(51) Int. Cl.
| | |
|---|---|
| H04N 5/77 | (2006.01) |
| H04N 21/4223 | (2011.01) |
| H04N 21/61 | (2011.01) |
| H04N 5/232 | (2006.01) |
| G06K 9/00 | (2006.01) |
| H04N 7/18 | (2006.01) |
| H04N 21/2187 | (2011.01) |
| H04N 9/804 | (2006.01) |
| G10L 17/00 | (2013.01) |

(52) U.S. Cl.
CPC ..... *H04N 21/4223* (2013.01); *G06K 9/00771* (2013.01); *H04N 5/23206* (2013.01); *H04N 5/77* (2013.01); *H04N 7/18* (2013.01); *H04N 9/8042* (2013.01); *H04N 21/2187* (2013.01); *H04N 21/6131* (2013.01); *G06K 9/00288* (2013.01); *G10L 17/00* (2013.01)

(58) Field of Classification Search
USPC ............ 386/223–229, 259; 348/158, 61
See application file for complete search history.

(56) References Cited

U.S. PATENT DOCUMENTS

| | | | | |
|---|---|---|---|---|
| 6,996,251 | B2 * | 2/2006 | Malone | H04N 1/32101 382/100 |
| 7,269,335 | B2 * | 9/2007 | Okamoto | G11B 27/105 386/229 |
| 9,298,741 | B1 * | 3/2016 | Strand | G06F 17/30244 |
| 9,552,844 | B2 * | 1/2017 | Fujimoto | G11B 27/034 |
| 2003/0095688 | A1 * | 5/2003 | Kirmuss | B60R 11/02 382/105 |
| 2004/0085446 | A1 * | 5/2004 | Park | H04N 7/1675 348/143 |
| 2005/0018768 | A1 * | 1/2005 | Mabey | H04L 29/06 375/240.2 |
| 2005/0068417 | A1 * | 3/2005 | Kreiner | G07C 5/0858 348/143 |
| 2005/0120128 | A1 * | 6/2005 | Willes | H04N 21/00 709/232 |

(Continued)

*Primary Examiner* — Nigar Chowdhury

(57) ABSTRACT

The invention disclosed relates to the end to end system, the methods and apparatuses for delivering real time HD video and audio content using a secure chain of custody method over the ubiquitous cellular network and providing a solution for the lone worker in hazardous environments.

24 Claims, 13 Drawing Sheets

(56) References Cited

U.S. PATENT DOCUMENTS

| | | | | |
|---|---|---|---|---|
| 2006/0082730 A1* | 4/2006 | Franks | .................... | F41A 17/06 |
| | | | | 352/95 |
| 2006/0098088 A1* | 5/2006 | Raghunath | ............. | H04N 5/782 |
| | | | | 348/61 |
| 2008/0147246 A1* | 6/2008 | Cochran | ............ | G07C 9/00087 |
| | | | | 701/1 |
| 2008/0288986 A1* | 11/2008 | Foster | .............. | G08B 13/19656 |
| | | | | 725/62 |
| 2008/0303903 A1* | 12/2008 | Bentley | ............ | G08B 13/19606 |
| | | | | 348/143 |
| 2009/0232357 A1* | 9/2009 | Angell | ............... | G06K 9/00604 |
| | | | | 382/103 |
| 2014/0121830 A1* | 5/2014 | Gromley | ............... | G07F 19/209 |
| | | | | 700/236 |
| 2014/0146171 A1* | 5/2014 | Brady | .................... | H04N 7/188 |
| | | | | 348/143 |
| 2014/0337473 A1* | 11/2014 | Frusina | .................. | H04L 5/003 |
| | | | | 709/217 |
| 2014/0347475 A1* | 11/2014 | Divakaran | ......... | G06K 9/00771 |
| | | | | 348/135 |
| 2014/0372517 A1* | 12/2014 | Zuili | ................. | H04N 21/4788 |
| | | | | 709/203 |

* cited by examiner

LAW ENFORCEMENT REAL TIME DIGITAL INFORMATION CHAIN OF CUSTODY ASSURANCE SYSTEM AND METHOD

TECHNICAL FIELD

This disclosure relates to wireless communications, video compression technology, portable wireless video and audio capture apparatuses and the Internet. More specifically this disclosure relates to: (1) a central system for the collection of encrypted and compressed video and audio content to be sent to a Software as a Service (SaaS) environment for storage, decompression, archive and retrieval, (2) a central system for the de-encryption and decompression of video and audio content when requested to be delivered to fixed wired or portable wireless display apparatuses based on the subscriber's authenticated credentials, content identifier, date interval and time interval, (3) a portable or fixed video and audio capture apparatus with capability store encrypted high definition video and audio data on removable or non-removable non volatile memory, (4) a portable or fixed apparatus with the capability to compress each video frame and audio packet, encrypt each compressed video frame and audio packet to where the encrypted and compressed data size can fit within the bandwidth of any wireless cellular technology, (5) assure the chain of custody where the video and audio content cannot be deleted, destroyed, altered or created by sending the video and audio content in real time to the SaaS platforms while in cellular coverage and store and forward the video and audio content while not in cellular coverage. This end to end system between video and audio content capture, storage, archive and retrieval components utilizes heretofore unavailable methods, apparatuses and enabling technologies combined in this invention.

BACKGROUND OF THE INVENTION

Chain of custody for evidence in legal contexts, refers to the chronological documentation or paper trail, showing the seizure, custody, control, transfer, analysis, and disposition of physical or electronic evidence. Chain of custody is critical in determining authenticity. Digital information, unlike documents, is tangible only on a storage device, such as nonvolatile memory. The nonvolatile memory, whether mechanical or non-mechanical, bears no resemblance to the text, numeric, image audio or video data that is stored on the nonvolatile memory further complicating the identification, handling, transport, storage and retrieval of the digital information. The more isolated the source of digital information, due to isolated locations or because of limited supervision and observation, the more difficult to establish authenticity for the chain of custody for digital data.

Currently, there is a requirement for high fidelity data, video and audio, for law enforcement activities, especially when that data is used in the justice framework to establish guilt or innocence. It becomes imperative that the video and audio data that is generated by the capturing apparatus incorporates as many security features as possible which also mandates that the chain of custody is as robust as possible. Therefore, the following steps are mandated in capture, transmission, and retention of video and audio data otherwise known as the chain of custody of the video and audio data:

1. The data capturing apparatus is powered on and in the correct configuration to collect the video and audio data.
2. The data capturing apparatus is uniquely identifiable.
3. The data capturing apparatus is uniquely associated with an individual operating the data capturing apparatus.
4. The data is date stamped and time stamped to establish chronology.
5. The data is encrypted to prevent the data from being altered, falsely generated, or deleted.
6. The data is stored as soon as possible, in a secure location where credentials are required to access the data.

In addition to guaranteeing the chain of custody, real time sharing and distribution of the data provides additional security for lone workers, especially lone workers in hazardous work environments, such as law enforcement. If possible, all intermediate steps until the video and audio data are stored in a secure location should be minimized, supervised, and if possible, eliminated thereby reducing and/or removing any questions regarding the validity and authenticity of the video and audio data.

The current state of the art for police dash cams and the emerging body worn cameras rely on a method known as "store and forward" whereby the audio and video are stored on nonvolatile memory such as a hard disk in a trunk vault associated with the dash camera or a SD memory card, usually incorporated with the camera with little or no security. Then there is the manual transfer of the data to a central storage facility.

Because dash cams are integrated into the police vehicle electrical system, they are automatically activated when the police activate lights and siren in order to record video and audio of events instead of continuous video and audio recording which would generate an enormous volume of data to be stored and retrieved. The new body worn cameras are manually activated which has already caused chain of custody issues because the law enforcement office can choose what will be recorded. The removable memory cards are also and issue as they can be misplaced, lost, substituted, and erased. In addition there is no centralized supervision to know the health and status of the body worn cameras. Since the store and forward method only allows for observation by others after the incident has occurred, the current chain of custody provides the opportunity to tamper with or destroy evidence not favorable to the law enforcement officer.

Current form factors and attachment mechanisms also introduce failure modes that could break the chain of custody by allowing the video and audio capturing apparatus to be damaged or removed during physical interaction between the law enforcement officer and criminal suspects. Since the typical battery life of a camera taking movies is limited to a few hours, auxiliary batteries, tethered by exposed wires to the camera, provide additional failure modes by the wires becoming entangled with the surroundings or during physical interaction between an officer and civilians. Ruggedized and Military specification cell phones with their garment attaching pouches are ideal to reduce the failure modes of the video and audio capturing apparatus.

A ubiquitous wireless infrastructure of tremendous bandwidth would allow wireless transmission of video in real time. Although WiFi can accommodate the bandwidth of video data, it is not a ubiquitous infrastructure and has very limited range in the hundreds of feet. Cellular is ubiquitous, but the bandwidth required for video compressed to today's standards of H.264 or MPEG4 would require bandwidth that far exceeds today's 2G, 3G, and 4GLTE technology. This is why video, much less HD video, cannot be transmitted to or from a cellular device in real time.

Clearly, there is a need for an improved end to end system for live video and audio content delivery to a central facility that improves the current state of the art for chain of custody of data, real time observation of developing situations with law enforcement, especially lone workers, and real time exchange of video and audio data amongst law enforcement personnel.

SUMMARY OF THE INVENTION

According to the present state of the art, it is therefore the object of this invention to provide an end to end system comprised of (1) existing, (2) enabling and (3) newly disclosed technology components, apparatuses and methods that uniquely addresses the real time or live transmission of high quality video and audio data over the ubiquitous cellular network.

It is another object of this invention to provide for the improvement to the chain of custody for law enforcement video and audio data. This invention removes the manual handling of data modules that store the data. This invention also allows a central command to know when the recording apparatus is powered on to further assure the chain of custody of video and audio data.

Yet another object of this invention to provide for the exchange of video and audio content in real time between law enforcement officers and a central command and control facility in order to provide officer situational awareness for the command and control center.

Yet another object of this invention to provide for the improved safety of law enforcement lone workers by providing the real time situation as the situation develops.

Yet another object of this invention to provide a central command and control facility to know the health and status of all dash cams and body worn officer cameras.

Yet another object of this invention to provide a central command and control facility the ability to pan and zoom a dash camera.

Yet another object of this invention to provide a central command and control facility the ability to pan and zoom a body worn camera.

Yet another object of this invention is to integrate with other law enforcement, criminal justice, and homeland security data bases in real time to facilitate real time facial and voice recognition.

Yet another object of this invention is to provide real time information to the officer regarding the criminal history of people encountered by the officer as well as any outstanding warrants using video of documents and facial recognition of people encountered while driving or walking in their community.

Yet another object of this invention to interface with departments of motor vehicles using license plate recognition software to provide police vehicles and officers with body worn cameras real time license plate information as they drive and walk about their community.

Yet another object of this invention is to provide current street view data for mapping systems while officers walk their beat capturing street view video with GPS data.

(1) Existing Technology Components and Methods:

Other than the examples of existing state of the art technology components and methods already described in the BACKGROUND OF THE INVENTION, additionally the existing state of the art components and methods of the prior art end to end system disclosed by this invention can be seen in the following U.S. Patent documents:

U.S. Pat. No. 6,262,764 (hereinafter referred to as the 764 Patent application) is a continuation application of U.S. patent application Ser. No. 08/363,607 filed Dec. 23, 1994, now U.S. Pat. No. 6,037,977, incorporates a police vehicle which is provided with a closed vault securing a VCR in the trunk. A first camera is mounted on the dash. A second camera is mounted on a portable structure such as a clipboard which is removed from the vehicle. A telemetry link from the clipboard to the vehicle is established for transmitting video data to and from the police officer on foot out of the vehicle. Likewise, a digital data transmission link is established with various input and output devices on the clipboard. At the vehicle, one or more images are recorded on a VCR, and digital data can be transmitted from the vehicle to a remote site for communication with a remotely located police computer or other data base to enable enhanced performance in the field.

The first independent claim describes a method wherein the officer leaves to car to perform an investigation, although describing the collection of digital data, does not cite the collection and transmission of live video to a central command and control facility. It also describes addressing part of the chain of custody as a VCR inside a vault in the trunk of the car.

The second independent claim describes a method for transmitting personal or vehicle identification.

The first dependent claim for claim 1 describes transmitting digital data and a video image.

Another dependent claim for claim one describes; "sending and receiving digital data from the police officer out of the police car, and further forming a fixed field of view video image from a video camera fixed in location on the police car".

Another dependent claim for claim one describes; "forming both digital data and also video image signals by the police officer out of the police car and recording both digital and video signals in the police car".

Another dependent claim for claim one describes; "operating a concealed camera to obtain a video image for recording on a cassette while the police officer is out of the police car".

The method claims disclosed by the 764 Patent describes video as an image (a single picture) and using a store and forward method traditional in police dash cam units today and storing portable camera image on a cassette. Clearly the 764 Patent does not disclose any technology for real time video transmissions.

U.S. Pat. No. 5,012,335 (hereinafter referred to as the 335 Patent application) discloses; "a video camera and video recording assembly electrically powered and disposed within a police vehicle for the viewing of exterior, surrounding areas of the vehicle for the purpose of recording events or activity within a predetermined field of view. The video camera is automatically operable to view and record the activities of selected police personnel during movement exterior of the vehicle or be manually positioned by police personnel located within the vehicle and further wherein the camera may be removed from its coupling and support structure associated with the vehicle for remote carrying by police personnel and observation and recording of activities, outside of the vehicle and out of normal visual range thereof."

The claims incorporate the traditional store and forward chain of custody of today's technology. Clearly the 335 Patent does not disclose any technology for real time video transmissions.

U.S. Pat. No. 4,949,186 (hereinafter referred to as the 186 Patent application) discloses; "a system comprises a camera and a control head mounted within the police vehicle and a video recorder housed in a fireproof, bulletproof and environmentally controlled vault mounted in the trunk of the vehicle. The surveillance system also includes a wireless microphone. The system may be manually or automatically activated and is powered off the battery of the vehicle".

(2) Enabling Technology Components and Methods:

Video compression is useful because it helps reduce resource usage, such as data storage space or transmission capacity. Because compressed data must be decompressed to use, this extra processing imposes computational or other costs through decompression. Data compression is subject to a space-time complexity trade-off. For example, a compression scheme for video may require expensive special purpose hardware (since hardware is still faster than software on a general purpose computer) for the video to be decompressed fast enough to be viewed as it is being decompressed. The option to decompress the video in full before watching does not satisfy real time requirements of seeing it as it happens. Full decompression will also require additional storage. The design of data compression schemes involves trade-offs among various factors, including the degree of compression, the amount of distortion introduced when the video is decompressed, and the computational resources required to compress and decompress the data.

Lossy data compression is the converse of lossless data compression. In these schemes, some loss of information is acceptable. Dropping nonessential detail from the data source can save storage space. Lossy data compression schemes are informed by research on how people perceive the data in question. For example, the human eye is more sensitive to subtle variations in luminance than it is to variations in color. JPEG image compression works in part by rounding off nonessential bits of information. There is a corresponding trade-off between preserving information and reducing size. A number of popular compression formats exploit these perceptual differences, including those used in music files, images, and video.

Lossy image compression can be used in digital cameras, to increase storage capacities with minimal degradation of picture quality. Similarly, DVDs use the lossy MPEG-2 Video codec for video compression.

Below is the history of video compression:

| Year | Standard | Implementation |
|------|----------|----------------|
| 1984 | H.120 | |
| 1988 | H.261 | Videoconferencing, Videotelephony |
| 1993 | MPEG-1 Part 2 | Video-CD |
| 1995 | H.262 | Blue Ray |
| 1996 | H.263 | Mobile Phones |
| 1999 | MPEG4 | Internet |
| 2003 | H.264 | Blue Ray |
| 2009 | VC-2 | HDTV |
| 2013 | H.265 | |

The twenty years of video compression development has not produced a lossless compression that will compress video files small enough to fit within the data bandwidth of the cellular phone networks.

For example:

The 2G network, known as GSM, has a data bandwidth of 64 Kilobits per second. Main use is voice, text messaging and pictures using MMS.

The 3G network, 144 Kilobits per second to 2 megabits per second. Main use is Internet.

The 4GLTE network, eventually will provide 100 Megabits per second to 20 Megabits per second.

The bandwidth required for full motion (30 frames/second) HD Video is 1.5 Gigabits per second. The problem of sending full motion HD video over the cellular network is out of reach by 3 orders of magnitude or 1000 times. Video over cellular has not been achievable with the current state of the art in video compression.

Cellphones, although developing rapidly, are not yet capable of performing the intense computing required of the current state of the art compression algorithms and the compression algorithm disclosed herein.

Today, there are "computers on a stick", as known in the art, whereby the functions of a processor, volatile memory, nonvolatile memory, display interface, keyboard interface, high speed serial inputs/outputs, medium range blue tooth wireless and longer range WiFi wireless interface with the ability to execute applications developed for Windows, Linux, and Android operating systems, i.e. and entire computer in the form factor of a pack of gum. Such a "computer on a stick" is capable of executing the video compression and encryption algorithms that are enablers for this invention.

Another means to accomplish this the compression and encryption algorithms is to be placed in an ASIC (Application Specific Integrated Circuit). With this ASIC connected by an interface, wired or wireless to the phone, the phone can be both a real time video and audio capture and display device.

(3) Newly Disclosed Components and Methods:

Recently, X Wave, a new proprietary video compression was announced that can compress full motion HD video and audio to 56 kilobits per second and encrypt each video frame and audio packet. This new enabling technology makes it possible to send full motion HD video over 2G, 3G and 4GLTE cellular networks.

By sending the live encrypted and compressed video directly to storage, the chain of custody is secure and accomplished with the minimum number of steps possible with no human intervention.

This invention of an end to end system comprised of methods and apparatuses that utilizes this proprietary video compression as a technology enabler makes possible streaming HD video over any cellular technology in use today, anywhere in the world. This invention makes possible the real time distribution of HD video from lone workers as well as teams to a command and control center using the ubiquitous cellular infrastructure. Additionally, the amount of storage required to store this compressed video is also dramatically reduced.

The present invention thus discloses several apparatuses, techniques and methods regarding the capability to transmit real time HD video across any cellular infrastructure.

The foregoing has outlined rather broadly the more pertinent and important features of the present invention in order that the detailed description of the invention that follows may be better understood so that the present contribution to the art can be more fully appreciated. Additional features of the invention will be described hereinafter, which form the subject of the claims of the invention. It should be appreciated by those skilled in the art that the conception and the specific embodiment disclosed may be readily utilized as a basis for modifying or designing other structures and systems for carrying out the same purposes of the present invention in domains other than law enforcement. It should also be realized by those skilled in the art that such equivalent constructions do not depart from the spirit and scope of the invention as set forth in the appended claims.

BRIEF DESCRIPTION OF THE FIGURES AND TABLES

DETAILED DESCRIPTION OF THE INVENTION

Figure 1:
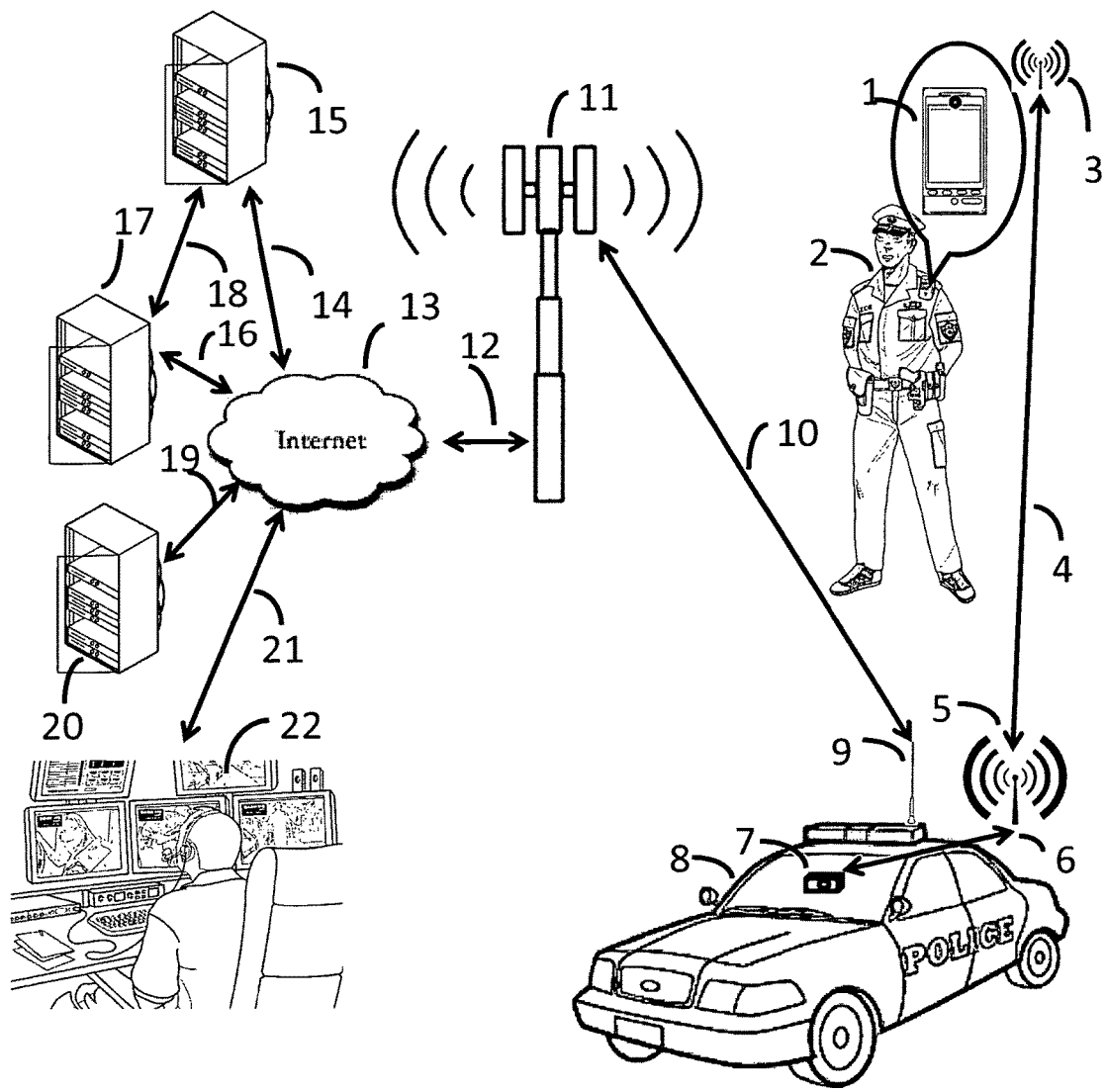
FIG. 1 depicts one embodiment the end-to-end system architecture of the invention.

The end to end system depicted in FIG. 1 shows the components for the chain of custody of video and audio data. The data types of streaming audio and streaming video as message content delivery are encompassed herein.

In this embodiment of the end to end system, the video and audio capture device 1 is depicted as a smart phone, with an electronically steerable (pan and tilt) as known in the art and an electronically controlled zoom attached to the officer's 2 shirt with the camera pointed forward. Many cameras also have WiFi Communications that have enough bandwidth to transmit uncompressed video and could be used in lieu of the smart phone 1. The smart phone 1 is depicted because in addition to a WiFi interface 3, the smart phone provides two way communication 4 for both IP voice and data and cellular voice and data whereby the command and control center and other officers 2, 46 can share information.

The uncompressed video and audio in this embodiment is sent using a WiFi link 4 over a medium distance to the police vehicle 8 where the dash camera 7 performs several functions:
1. The processor and memory in the dash camera receive from the smart phone 1 the uncompressed voice and data 6 over a wired or wireless connection to the WiFi transceiver 5 either in the police vehicle 8 or built into the driver camera 7.
2. The compression algorithm described herein executes on the processor and memory in the dash cam 7 to compress and encrypt each video frame and each digital voice packet received from the smart phone 1 over the wireless link 4.
3. The compression algorithm and encryption algorithm as is known in the art and described herein executes on the processor and memory in the dash cam 7 to compress and encrypt each video frame and each digital voice packet received from the dash camera.
4. The combined compressed and encrypted video and voice from the body worn capture device 1 and the dash camera 7 are sent out the cellular antenna 9 mounted on the police vehicle over the wireless link 10 to the cellular tower 11.

Should the wireless link 4 not be available, the application in the smart phone 1 will buffer the video and audio on nonvolatile memory, such as SD memory, until the wireless link 4 is restored.

Should the cellular wireless link 10 not be available, the application in the dash camera 7 will buffer both the body worn device 1 video and audio and the dash camera 7 video and audio data on nonvolatile memory, such as SD memory, until the wireless link 10 is restored.

All wireless connections disclosed herein use TCP (Transport Connection Protocol) or any connection oriented protocol to assure delivery.

Once the compressed voice and data from the body worn device 1 and the dash camera 7 are delivered to the cellular tower 11, they are routed by the cellular network 12 to the Internet 13 for delivery 14 to the storage system 15. At the point of cellular transmission, the cellular modem unique IMEI or ESN (Electronic Serial Number) is sent with the data to uniquely identify the source of the data. The IMEI or ESN is assigned to an officer 2 just as every cell phone is mapped to a phone number or user.

Once the data is stored on the servers 15, it is ready to be routed, compressed or uncompressed, encrypted or decrypted, to one or more destinations. The routing can be based on a real time connection or as a result of a query for historical video and audio information. At this point, the secure chain of custody is complete.

This embodiment depicts the routing of decompressed video and audio considering that the links between the decompression server 17 and the final destination have sufficient bandwidth, in this embodiment the route of links to the command and control center 22, have sufficient bandwidth. The video and audio data can be sent encrypted or decrypted.

The storage server 15 and the decompression server 17 can also interface to other application such as OCR (Optical Character Recognition) and license plate recognition, facial recognition and voice recognition applications providing a SaaS for the end to end system.

The decompression server 17 can be either LAN 18 (Local Area Network) attached to the storage server 15 via the Internet 13 using communication paths 14 and 16.

The decompressed video and audio can also be sent 19 to one or more facial and voice recognition servers 20 such as the National Driver Register, Computer Assisted Passenger Prescreening System, National Law Enforcement Telecommunications System, Computerized Criminal History System, and National Crime Information Center. Other data bases such as state DMV's (Department of Motor Vehicles) can be interfaced using license plate recognition software as part of the decompression server 17 SaaS.

The command and control center 22 can received decompressed video and audio streams over link 21 and obtain situational awareness for each law enforcement officer 2, 46 connected to the command and control center 22.

Figure 2:
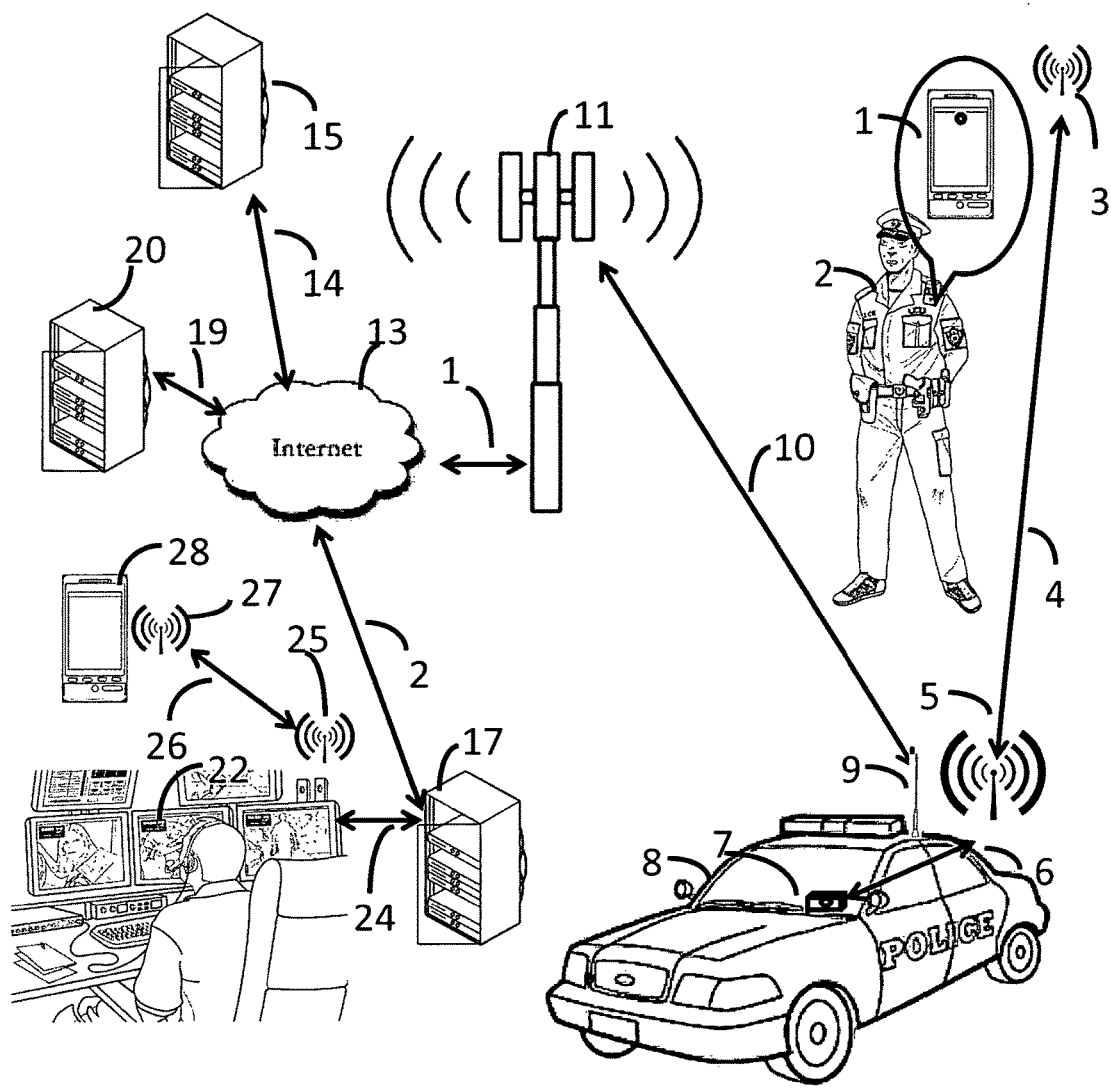
FIG. 2 depicts another embodiment the end-to-end system architecture of the invention.

FIG. 2 depicts another end to end system embodiment where the storage server sends compressed data 23 to the command and control center 22 using a decompression server 17 LAN attached 24 to the Command and Control Center 22.

Using high speed wireless 25 and 27, the delivery of HD video and audio can be delivered to portable devices 28 over wireless link 26.

Figure 3:
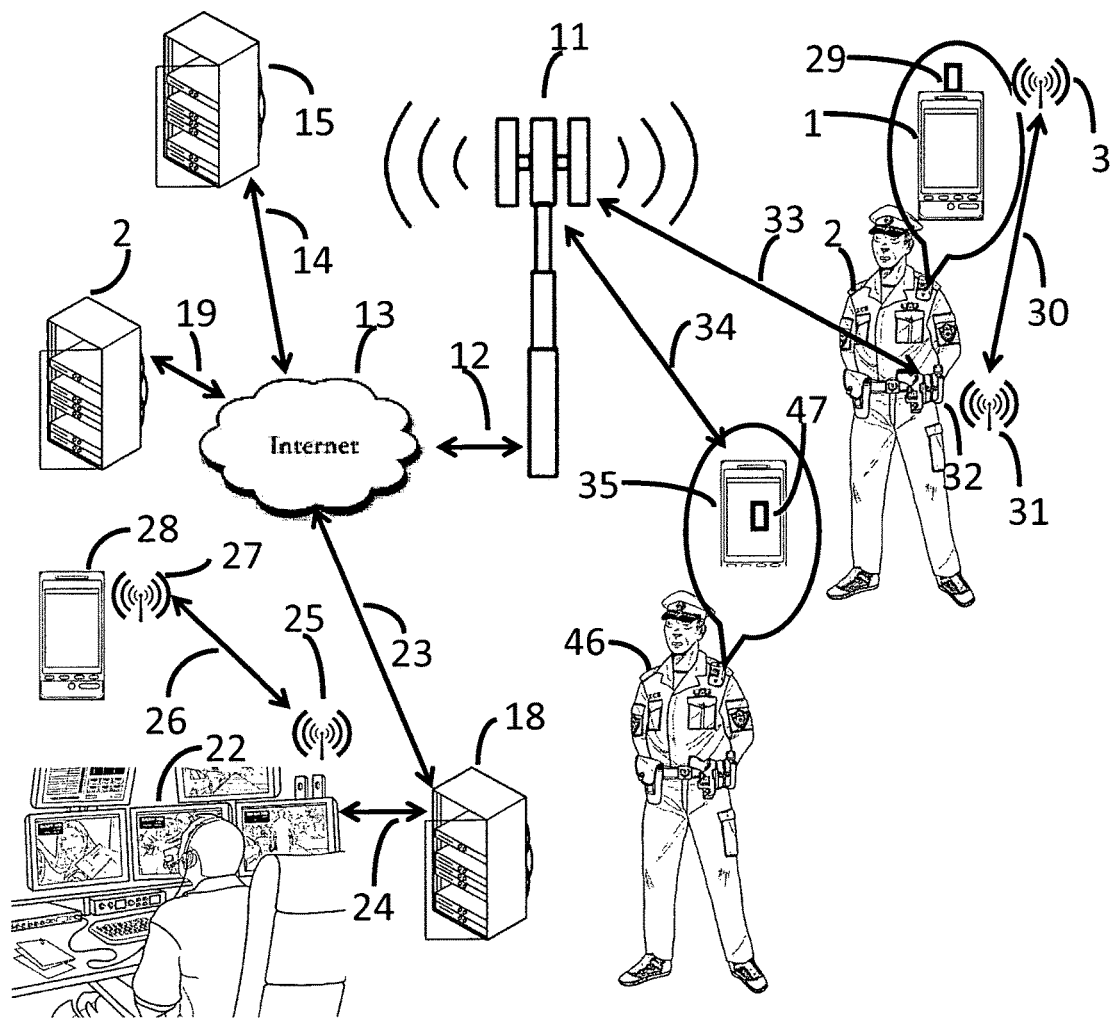
FIG. 3 depicts another embodiment the end-to-end system architecture of the invention.

FIG. 3 depicts yet another end to end system embodiment where the officer 2 can directly compress and decompress video when the smart phone 1 is linked to a "computer on a stick" device 29 either plugged into a port on the smart phone 1 or in a tool belt pouch 32 using WiFi 32, wireless link 30, and WiFi 3.

It is yet another embodiment of this invention to integrate an ASIC 47 (Application Specific Integrated Circuit) as known in the art into the smart phone 35 allowing the smart phone 35 to be a video and audio capture device as well as a video and audio playback device and directly connect 34 to the cellular network 12 via the cellular tower 11 with compressed and encrypted video and audio data. All compressed video and audio data delivered to the cellular network 12 via cellular tower 11 is routed to the storage server via 23, 13, 14, and 15.

Figure 4:
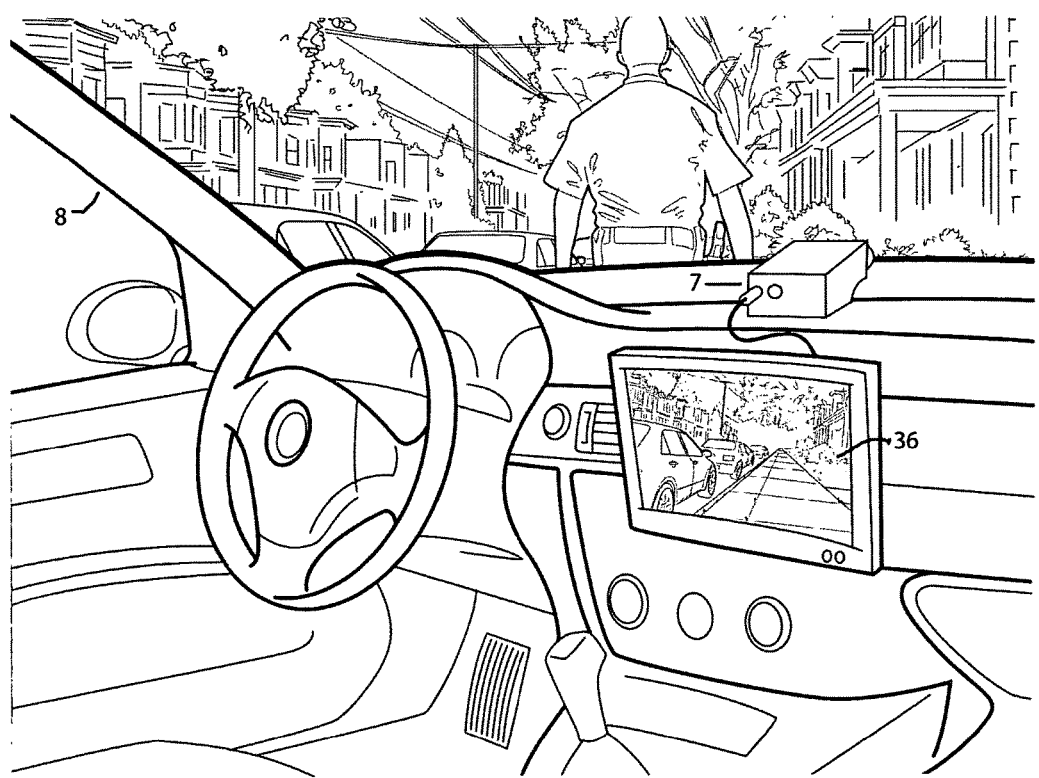
FIG. 4 depicts the dash camera and a typical dash camera view of the invention.

FIG. 4 depicts the officer 2 walking away from his vehicle 8 with the dash camera 7 displaying the dash camera on the vehicle 8 display 36.

Figure 5:
FIG. 5 depicts the dash camera view as the officer leaves the vehicle.

FIG. 5 depicts the dash camera view of the officer 2 walking away from his vehicle 8. If the officer 2 gets out of WiFi range with the vehicle 8 or dash camera 7 visual range, the command and control center 22 can still see video from the dash camera 7 in real time pan, tilt, and zoom the dash camera 7 to keep the officer 2 in view.

Figure 6:
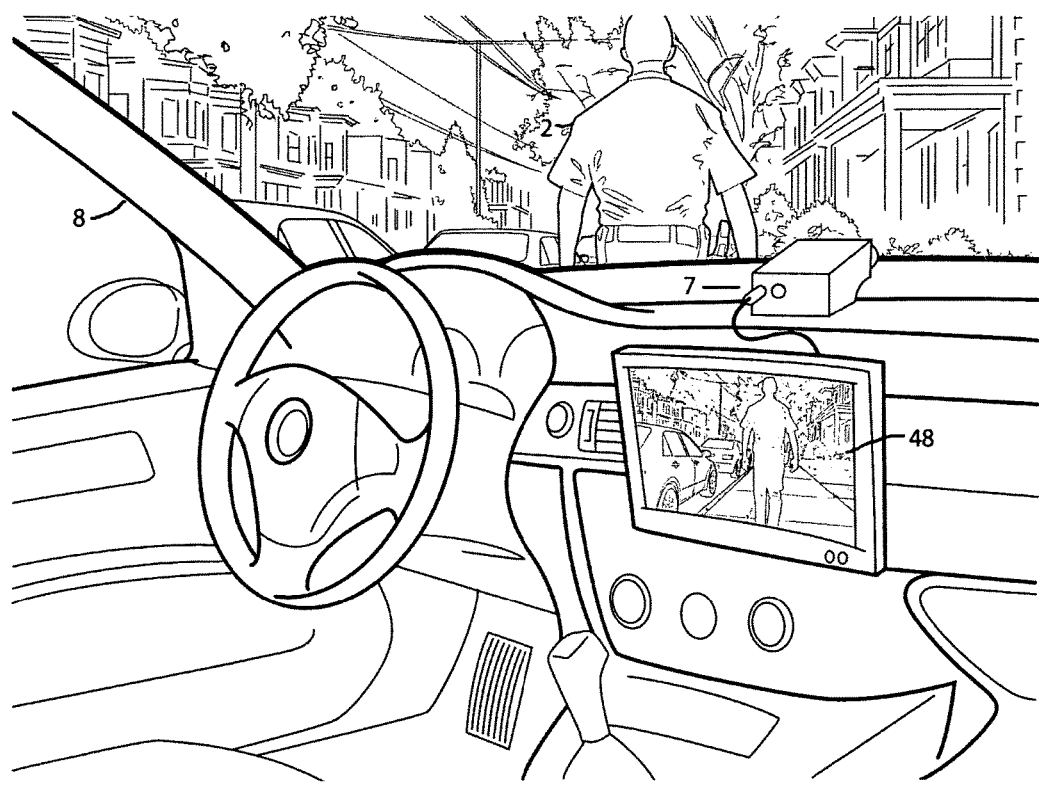
FIG. 6 depicts the body worn camera view transmitted to the police vehicle dash camera video system.

FIG. 6 depicts the dash camera view of the officer 2 walking away from his vehicle 8. If the officer 2 gets out of WiFi range with the vehicle 8, then the officer body worn camera 1 will start buffering the video and audio on to nonvolatile memory until WiFi coverage is restored whereby the video and audio will be sent from the nonvolatile memory to the storage server 15.

Figure 7:
FIG. 7 depicts the view from the officer body worn camera.

FIG. 7 depicts the officer 2 body worn camera 1 view. While walking the GPS data from the smart phone 1 can be combined with the video to build current street view data for GIS mapping systems.

Figure 8:
FIG. 8 depicts the driver view of the officer while handing over an identification document showing the body camera orientation.

FIG. 8 depicts an officer 2 obtaining identification 37 from an automobile driver. The smart phone 1 can capture video of all occupants in the vehicle and transmit the video in real time for facial recognition analysis. Early warning and backup can be sent to the officer 2 should any occupant need to be detained.

Figure 9:
FIG. 9 depicts the officer examining the documentation and the body worn camera capturing the documentation.

FIG. 9 depicts an officer 2 capturing information from the driver provided document 37. Should the officer 2 be out of WiFi range with the vehicle 8, the smart phone 1 will use the computer on a stick 32 WiFi and compress the data using the computer on a stick 32 built in hotspot to send the data over the cellular network 11.

Figure 10:
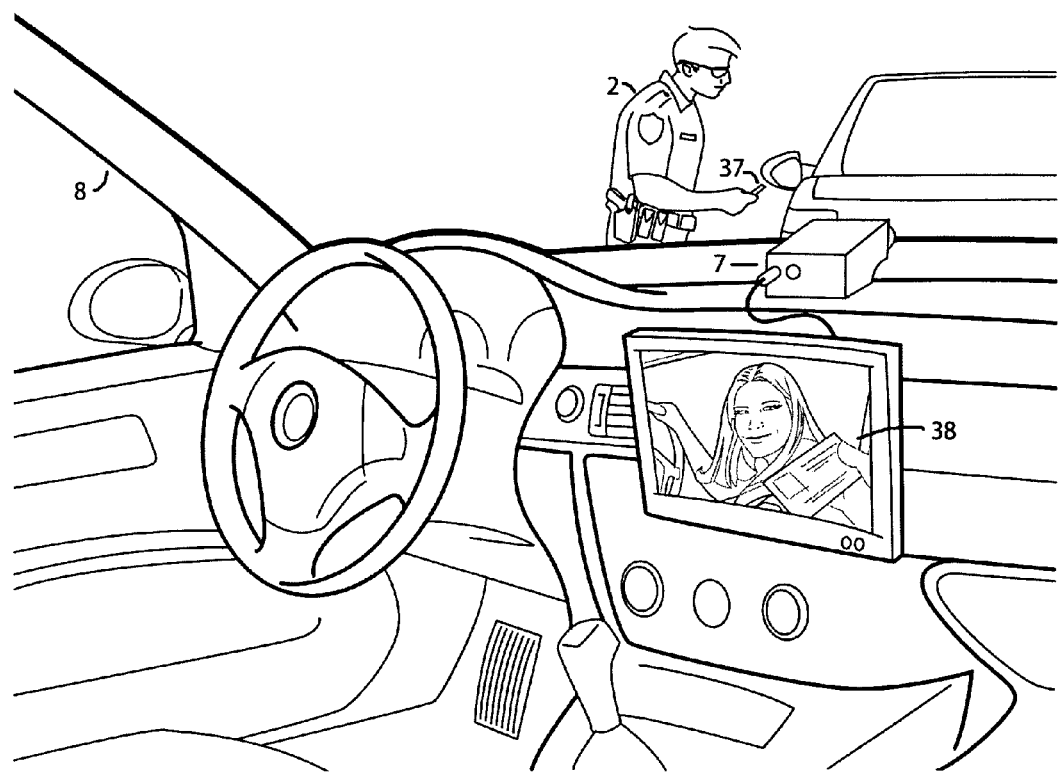
FIG. 10 depicts the dash camera capturing the video and audio conversation between the officer and the driver.

FIG. 10 depicts the officer 2 capturing information from the driver provided document 37 being viewed on the dash camera 7 with the video 38 being shared with the command and control center 22.

Figure 11:
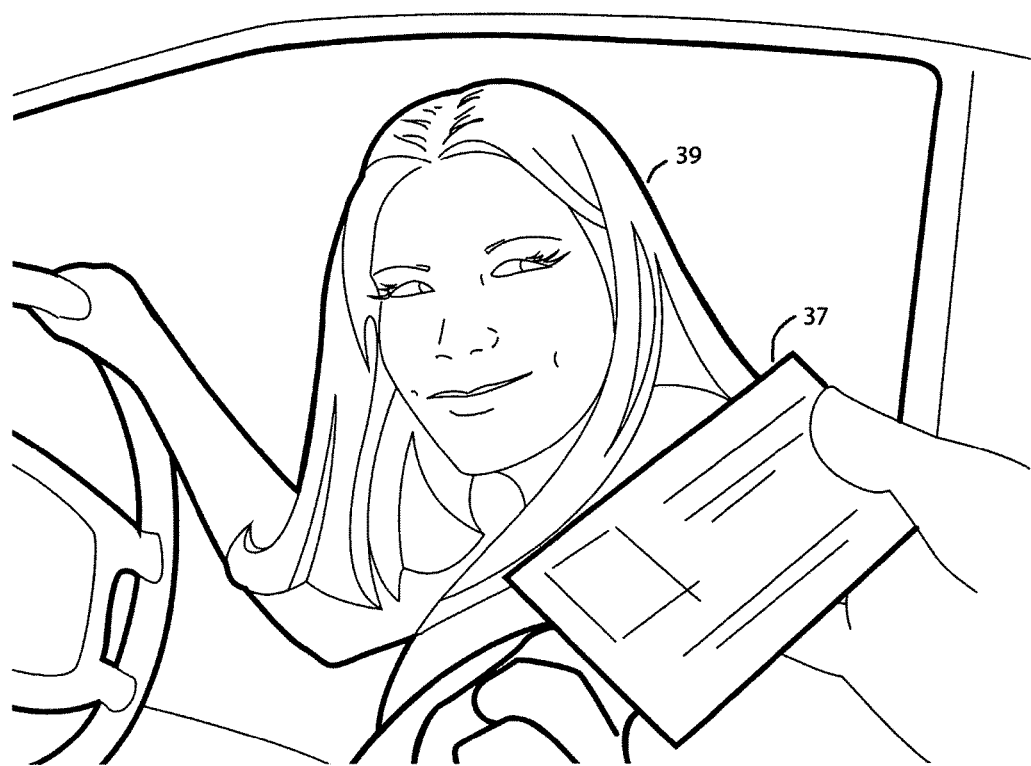
FIG. 11 depicts the officer body worn camera capturing the face geometry of the driver.

FIG. 11 depicts the officer's 2 body worn camera 1 view of the document 37 and the driver 39. At this time the facial geometry of the driver and passengers can be processed by the SaaS in servers 15, 17 or their associated interfaces via the Internet 13.

Figure 12:
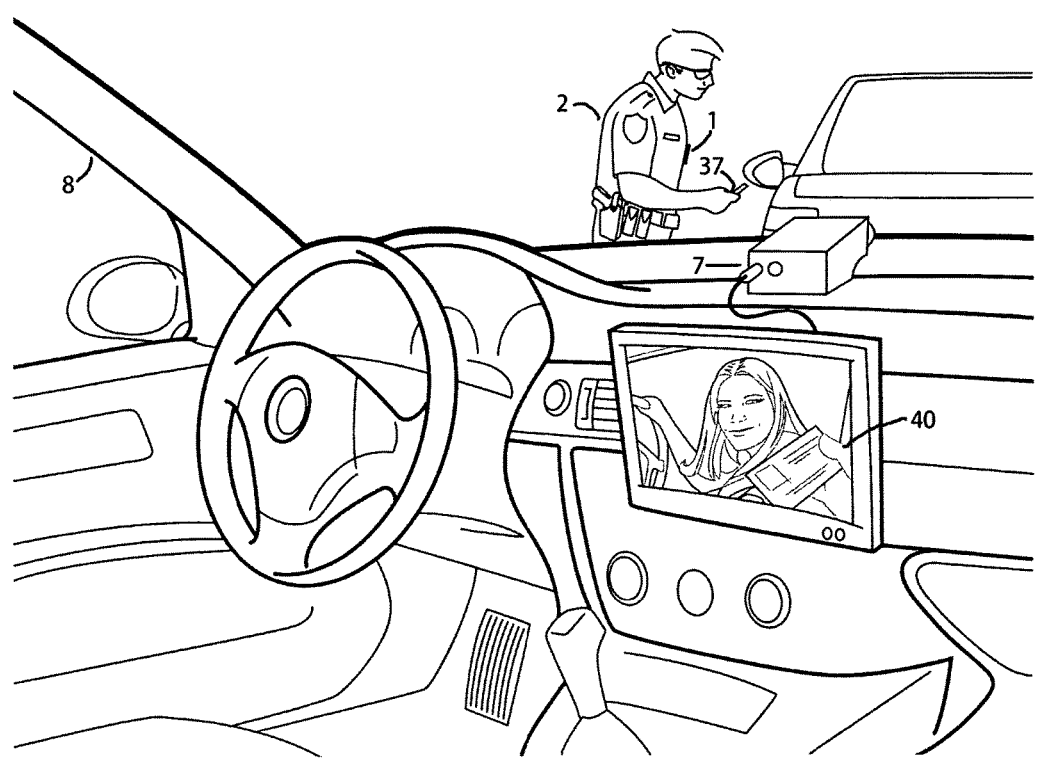
FIG. 12 depicts the officer body worn camera information regarding the driver being transmitted to the officer's vehicle.

FIG. 12 depicts the body worn camera 1 video and audio 40 being relayed through the dash camera 7 WiFi to the dash camera 7 for compression, encryption and transmission over the cellular 11 network to the command and control center 22.

Figure 13:
FIG. 13 depicts the command and control center for the officer and officer video and audio streams.

FIG. 13 depicts the command and control center 22 with multiple videos 41, 42, 43, and 44 and the dispatcher with a headset and microphone 45 to interact with the officer 2. By receiving the video and audio streams from the officer 2, the command and control center knows when the video and audio capture equipment 1, 7 is powered on and correctly configured. The command and control center 22 has the ability to turn the video and audio capture apparatus 1 off, thereby documenting when the apparatus was on or off and if off, the reason.

What is claimed:

1. A system that provides evidentiary chain of custody video and data by real-time authenticated, encrypted, and lossless compressed date stamped and time stamped video, audio, geospatial latitude and longitude location data, and video configuration parameters and settings, said system comprised of; 1) one or more video and audio capture devices, a video and audio capture device comprising a video camera of one or more video camera types, wherein a video camera type provides video, audio, date stamp, time stamp, video and audio capture device configuration settings and parameters, and geospatial latitude and longitude location data of the video and audio capture device, 2) the device in the video and audio capture device that performs lossless video compression in real-time, 3) the device in the video and audio capture device that performs authentication and encryption of the video and audio capture device video, audio, and data in real-time thereby establishing the chain of custody for the video and audio capture device video, audio, and data using a secure point to point encrypted tunnel transmitting and receiving encrypted data packets between the one or more video and audio capture devices and the one or more central data storage systems using cellular broadband wireless communications, and 4) the one or more central data storage systems connected to the one or more real-time decryption and decompression viewing portal command centers for viewing streaming video and hearing streaming audio in real-time or post real-time associated with corresponding geospatial latitude and longitude location and data on stationary or mobile, wired or wireless, display devices the system further comprising: wherein the real-time video from one or more central data storage systems is integrated with facial recognition, audio recognition, and license plate recognition in real-time from the video captured by the owner or operator of one or more video and audio capture devices and information results can be provided to the owner or operator of the one or more video and audio capture devices in real-time using two way voice and/or data communication between one or more video and audio capture devices, one or more owner or operator headsets, one or more command and control centers and one or more central data storage systems, said information results to include the results of 1) facial recognition, 2) voice recognition, 3) license plate recognition, 4) optical character recognition, and 5) person detention information.

2. The system of claim 1 that provides real-time situational awareness by assuring chain of custody for real-time data between the video and audio capture device and display devices.

3. The system of claim 1 wherein the video and audio capture device is mobile or stationary.

4. The system of claim 1 wherein the mobile video and audio capture device is vehicle mounted, hand held, or body worn.

5. The system of claim 1 wherein the video and audio capture device can buffer authenticated, encrypted and compressed video, audio, geospatial latitude and longitude location data, video and audio capture device parameters and settings for later transmission when wireless broadband communications are not available.

6. The system of claim 1 wherein the video and audio capture device can be monitored in real-time as to its status;
   a. Powered on or off,
   b. Owner/operator of the video and audio capture device
   c. Battery level, and
   d. Configurations for;
   e. Sensitivity,
   f. Spectrum
   g. Pan,
   h. Tilt, and
   i. Zoom.

7. The system of claim 1, wherein the video and audio capture device can be controlled in real-time;
   a. Powered on or off, and
   b. Configurations for;
   c. Sensitivity,
   d. Spectrum,
   e. Pan,
   f. Tilt, and
   g. Zoom.

8. The system of claim 1 wherein the video and audio capture device performs real-time authentication, encryption, and lossless compression of the video, audio, date stamp, time stamp, status, geospatial latitude and longitude data, and video and audio capture device configuration settings and parameters, wherein authentication, and/or encryption, and/or lossless compression is comprised of software algorithms that execute in a processor with an operating system.

9. The system of claim 1 wherein the video and audio capture device performs real-time authentication, encryption, and lossless compression of the video, audio, date stamp, time stamp, geospatial latitude and longitude location data, and video and audio capture device configuration settings and parameters, wherein authentication, and/or encryption, and/or lossless compression is comprised of digital logic that executes as an integrated circuit.

10. The system of claim 1 wherein the video and audio capture device broadband wireless communications device is based on a cellular or WiFi networks.

11. The system of claim 1 wherein the central data storage authenticates the video and audio capture device.

12. The system of claim 1 wherein the central data storage associates the video and audio capture device with an owner or operator.

13. The system of claim 1 wherein the central data storage system has a point to point encrypted communications tunnel with the video and audio capture device.

14. The system of claim 1 wherein a decryption and decompression portal attached to the central data storage provides one or more command and control centers and one or more display devices capability to observe real-time data from the video and audio capture device and send authenticated and encrypted commands and data to the video and audio capture device.

15. The system of claim 1 wherein video from the video and audio capture device can be utilized in conjunction with the video and audio capture device associated geospatial latitude and longitude location data to update street views for geospatial information and mapping systems.

16. The system of claim 1 wherein the real-time video encryption for the video and audio capture device is for each video frame.

17. A method to provide a bi-directional chain of custody data between one or more video and audio capture devices, one or more owner or operator headsets, one or more command and control centers, and one or more central data storage systems for real-time and post-real-time by implementing authentication, real-time lossless compression, and real-time encryption at the video and audio capture device
   the method further comprising: wherein the real-time video from one or more central data storage systems is integrated with facial recognition, audio recognition, and license plate recognition in real-time from the video captured by the owner or operator of one or more video and audio capture devices and information results can be provided to the owner or operator of the one or more video and audio capture devices in real-time using two way voice and/or data communication between one or more video and audio capture devices, one or more owner or operator headsets, one or more command and control centers and one or more central data storage systems, said information results to include the results of 1) facial recognition, 2) voice recognition, 3) license plate recognition, 4) optical character recognition, and 5) person detention information.

18. The method of claim 17 wherein evidentiary chain of custody video and data is provided by the real-time transmission of authenticated, real-time encrypted, and real-time lossless compressed timestamp, date stamp, video, audio, geospatial latitude and longitude data, video and audio capture device configuration parameters and settings with the central data storage system.

19. The method of claim 17 wherein real-time wireless transmission to the central data storage system of timestamp, date stamp, video, audio, geospatial latitude and longitude location data, video and audio capture device parameters and settings data is provided by real-time lossless compression to accommodate the bandwidth of broadband cellular networks.

20. The method of claim 17 wherein evidentiary chain of custody for video, audio, date stamp, time stamp, geospatial latitude and longitude location data, video and audio capture device parameters and settings, is provided by establishing a secure point to point tunnel between the video and audio capture device and the central data storage system.

21. The method of claim 17 wherein real-time evidentiary chain of custody provides real-time situational awareness of the video and audio capture device at the command center.

22. The method of claim 17 wherein the video and audio capture device can be provided real-time facial, audio, and license plate recognition providing real-time situational awareness from the central storage system or command and control center to the owner or operator of the video and audio capture device.

23. The method of claim 17 wherein the street view for geospatial information mapping systems can be updated from the video frames and associated geospatial latitude and longitude location data from the video and audio capture device.

24. An apparatus video and audio capture device, stationary or mobile, that provides evidentiary chain of custody video, audio and data by using one or more broadband wireless networks to authenticate with one or more central data storage systems, creating a secure point to point communications tunnel with the central data storage systems, capturing live video, audio, latitude and longitude location data, video and audio capture device configuration parameters and settings, encrypting video frame by frame using an encrypted secure tunnel, with date stamp, time stamp, audio, geospatial latitude and longitude location data, and video and audio capture device configuration parameters and settings, and performing lossless compression for the video and audio capture device video, audio, and data in real-time the apparatus further comprising: wherein the real-time video from one or more central data storage systems is integrated with facial recognition, audio recognition, and license plate recognition in real-time from the video captured by the owner or operator of one or more video and audio capture devices and information results can be provided to the owner or operator of the one or more video and audio capture devices in real-time using two way voice and/or data communication between one or more video and audio capture devices, one or more owner or operator headsets, one or more command and control centers and one or more central data storage systems, said information results to include the results of 1) facial recognition, 2) voice recognition, 3) license plate recognition, 4) optical character recognition, and 5) person detention information.

* * * * *